(12) United States Patent
Padgett

(10) Patent No.: US 7,453,766 B1
(45) Date of Patent: Nov. 18, 2008

(54) METHOD FOR DERIVING 3D OUTPUT VOLUMES USING SUMMATION ALONG FLAT SPOT DIP VECTORS

(76) Inventor: Michael John Padgett, 3709 Graustark St., Houston, TX (US) 77006

( * ) Notice: Subject to any disclaimer, the term of this patent is extended or adjusted under 35 U.S.C. 154(b) by 253 days.

(21) Appl. No.: 11/481,166

(22) Filed: Jul. 5, 2006

Related U.S. Application Data

(63) Continuation-in-part of application No. 11/158,118, filed on Jun. 21, 2005, now Pat. No. 7,266,041, and a continuation-in-part of application No. 10/721,983, filed on Nov. 25, 2003, now Pat. No. 7,206,782.

(51) Int. Cl.
 *G01V 1/30* (2006.01)
 *G01V 1/34* (2006.01)
(52) U.S. Cl. .................... 367/73; 367/38; 367/72
(58) Field of Classification Search .............. 367/38, 367/72, 73; 702/16
See application file for complete search history.

(56) References Cited

U.S. PATENT DOCUMENTS

| | | | |
|---|---|---|---|
| 5,001,677 A | 3/1991 | Masters | |
| 5,430,689 A | 7/1995 | Rigsby | |
| 5,583,825 A | 12/1996 | Carrozzone | |
| 5,671,136 A * | 9/1997 | Willhoit, Jr. | 702/18 |
| 5,862,100 A | 1/1999 | VerWest | |
| 5,930,730 A | 7/1999 | Marfut | |
| 6,058,074 A | 5/2000 | Swan | |
| 6,092,025 A * | 7/2000 | Neff | 702/10 |
| 6,131,071 A | 10/2000 | Partyka | |
| 6,278,949 B1 * | 8/2001 | Alam | 702/16 |
| 6,292,754 B1 | 9/2001 | Thomsen | |
| 6,463,387 B1 | 10/2002 | Runnestrand | |
| 6,498,989 B1 | 12/2002 | Pisetiski | |
| 6,674,689 B2 * | 1/2004 | Dunn et al. | 367/43 |

(Continued)

FOREIGN PATENT DOCUMENTS

WO WO9964896 * 12/1999

OTHER PUBLICATIONS

Freund, J.E. and Williams, F.J. "Dictionary/Outline of Basic Statistics" Dover 1966.

(Continued)

*Primary Examiner*—Jack W Keith
*Assistant Examiner*—Scott A Hughes
(74) *Attorney, Agent, or Firm*—Buskop Law Group, PC; Wendy Buskop

(57) ABSTRACT

A method of determining and analyzing spatial changes in the earth's subsurface. The method includes obtaining seismic attribute data as a 3D data volume and obtaining corresponding 3D dip and azimuth as a 3D volume and obtain corresponding 3D reliability volumes or 3D censor volumes which are representative of portions of the volume within in which a reliable dip and azimuth can be determined. A focused subvolume of interest within the 3D data volume is additionally selected. An average for the plurality of vector dips is computed and a flat spot direction vector for each structural dip and a flat spot direction vector dip magnitude is determined. Sequences of distances from each reliability location is defined and interpolated onto the direction of the flat pot direction vector. The sequences of interpolated seismic attribute data is summed and the summed sequences of interpolated seismic attributed data values are stored.

11 Claims, 10 Drawing Sheets

U.S. PATENT DOCUMENTS 6,735,526 B1 * 5/2004 Meldahl et al. ............... 702/14
2005/0171700 A1 * 8/2005 Dean ........................... 702/16

OTHER PUBLICATIONS

Fisher. R.A., and Yatex, F., "Statistical Tables for Biological, Agricultural, and Medical Research, 6th E.," Hafner Publishing, 1963.

Mandel, J "The Statistical Analysis of Experimental Data." Dover, 1964.

Lyons, L., "Statistics for nuclear and particle physics," Cambridge University Press, 1986.

Weisstein, Eric W., "Hotelling T2 Distribution." From Mathworld—A Wolfram Web Resource. http://mathworld.wolfram.com/HotellingT-SquaredDistribution.html.

"The significance of the difference between two means when the population variances are unequal" by B.L. Welch, 1938, 'Biometricka' 29, pp. 350-362.

W.V. Behrens, "Ein beitrag zuf Fehlerberechnung bei wenigen Beobachtungen", 'Landwirtschaftliche Jahrbuecher' 68, pp. 807-837.

"On the Behrens-Fisher Problem: A review", by Seock-Ho Kim and Allan Cohen, University of Wisconsin, 1995. Paper Presented at the annual meeting of the Psychometric Society, MN.

Hair, J.F. Black, W.C., Babin, B.J.,Anderson, R.E., Tatham, R.L., "Multivariate Data Analysis, 6th Ed.," Prentice Hall 2006, especially chapters 1, 5, and 8.

Hotelling, H., "Multivariate Quality Control Issustrated by the Air Testing of Sample Bombsights." in C Eisenhart, M.W. Hastay, and W.A. Wallis, eds., "Techniques of Statistical Analysis for Scientific and Industrial Research and Production and Managment Engineering." New York: McGraw-Hill, 1947.

* cited by examiner

3D Seismic Attribute Volume Slice Perpendicular to the Z axis

METHOD FOR DERIVING 3D OUTPUT VOLUMES USING SUMMATION ALONG FLAT SPOT DIP VECTORS

CROSS REFERENCE TO RELATED APPLICATIONS

The present application is a CIP to U.S. patent application Ser. No. 10/721,983 filed on Nov. 25, 2003 now U.S. Pat. No. 7,206,782 in addition to U.S. patent application Ser. No. 11/158,118 filed on Jun. 21, 2005 now U.S. Pat. No. 7,266,041.

FIELD

The present embodiments relate generally to a method of determining and analyzing spatial changes in the earth's subsurface.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. The exception to this is the case of heavy oil which may have a density greater than that of water. In the case of heavy oil, water may accumulate up-structure. Generally, the separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response.

The present invention is designed for the detection, quantification and evaluation of the depth and location of interface between lighter and heavier saturating fluids as exhibited in a data attribute dataset to locate the interface between a water reservoir and a hydrocarbon reservoir.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, explaining quantitatively why the anomaly of one prospect should be "believed or trusted" more than that of another prospect has not been possible. This lack of trust causes different entities to make drastically different investment decisions concerning prospects based on the same underlying data.

The present embodiments are designed for the quantification and evaluation of data anomalies in the search for producible hydrocarbon deposits. The present embodiments are designed to simultaneously quantify and summarize the hydrocarbon reservoir part of the anomaly, the water reservoir part of the data and the interfacial zone. The embodiments address the case of multiple hydrocarbon zones, e.g., gas over oil over water. The embodiments are designed to test the model wherein gas is less dense than oil and oil is less dense than water and the case of heavy oil being more dense than water or than gas, with data responses varying by structural position.

The current embodiments can be used for the quantification of changes in lithology, facies, or rock fabric from one location to another. The current embodiments are designed to function in areas of low signal-to-noise and aid in the determination of data suitability for hydrocarbon detection for the expected rock physics environment. The current embodiment, therefore, can be applied to the detection of subtle hydrocarbon related data anomalies.

A need exists for a method to scan large amounts of geophysical data sets systematically and simultaneously to find the presence of hydrocarbons. The method should honor non-statistical and highly structured (due to geology and rock properties) host rock geophysical responses. The method should honor small changes in the host rock layering or composition in constructing background data volumes for normalization and scanning.

The present embodiments meet these needs.

BRIEF DESCRIPTION OF THE DRAWINGS

The detailed description will be better understood in conjunction with the accompanying drawings as follows.

DETAILED DESCRIPTION OF THE EMBODIMENTS

Figure 1:
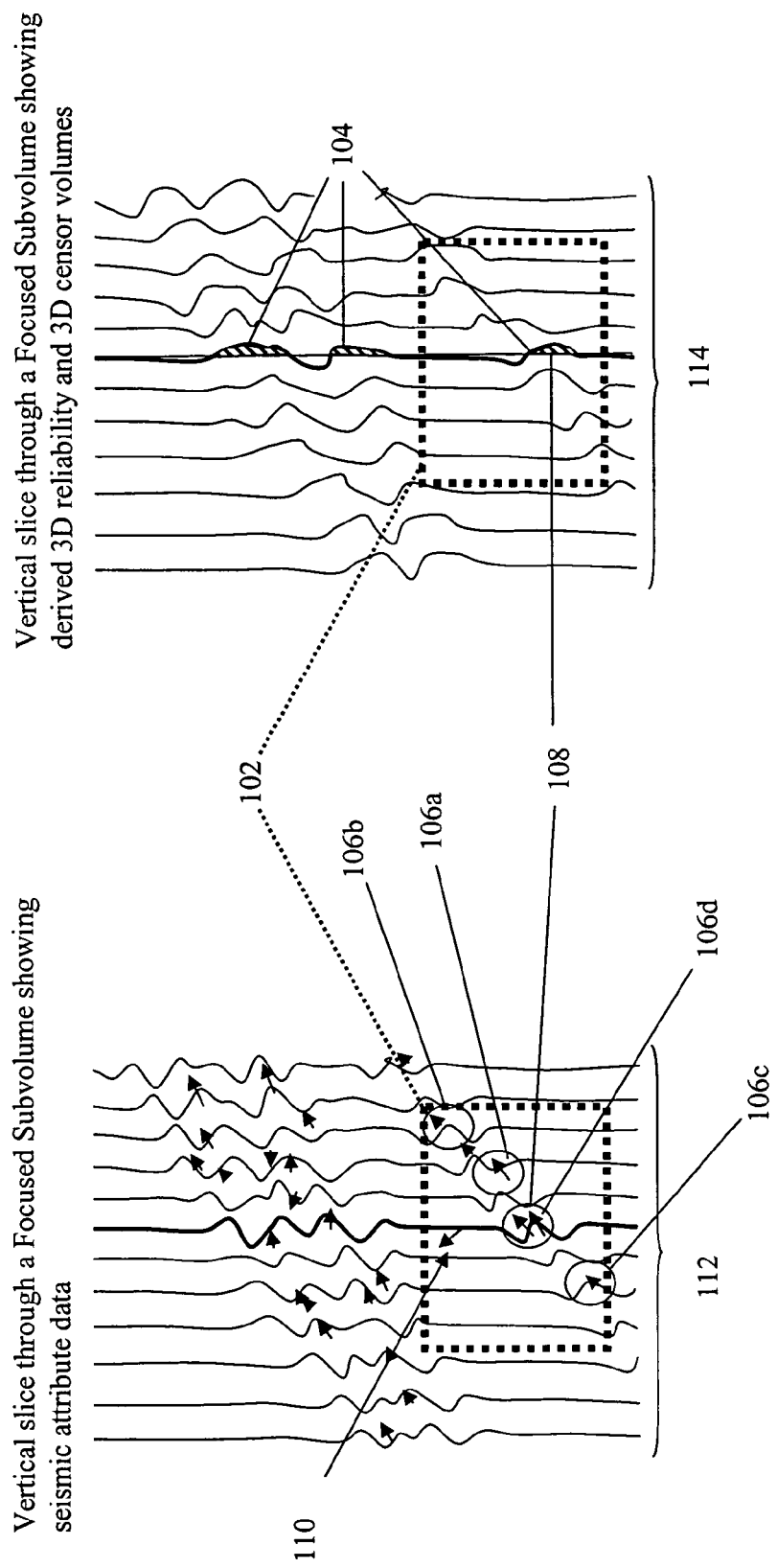
FIG. 1 is an example of derived corresponding 3D reliability volumes and 3D censor volumes for a set of 3D dip and azimuth data through a focused subvolume.

Before explaining the present embodiments in detail, it is to be understood that the embodiments are not limited to the particular embodiments and that they can be practiced or carried out in various ways.

The present method was conceived to detect the changes in a data set associated with an interface between a water reservoir and a hydrocarbon reservoir in a given focused area for a given geologic unit.

The method operates as a highly reliable low cost model, which will save expense in drilling in non-productive areas, and will reduce the amount of destruction to wilderness, as the intended Alaska drilling will incur, because of the method being able to focus only on the oil and water or natural gas and water interface for accurate drilling and evaluation, reducing the dry hole phenomena.

In addition, the method was conceived to operate in high noise, low signal to noise environments, where the data quality is poor. A benefit for operating in high noise, low signal to noise environments, is that computation time for determining the exact spot to drill is dramatically reduced. Another benefit of being able to operate in a high noise, low signal to noise environment is avoid the need to collect additional seismic data before exploratory drilling.

The method was designed to operate on subtle hydrocarbon indicators, such as seismic amplitude for generally pure oil reservoirs, deep gas reservoirs, or Class II or Class I AVO reservoirs. By operating on subtle hydrocarbon indicators, the method enables the user to perform volume based flat spot and fluid contact detection which has not been done successfully. The advantage of being able to perform flat spot and fluid contact detection is that fewer dry holes and therefore less drilling will occur.

The method determines errors and uncertainties in data attribute results relative to a given hydrocarbon reservoir and a corresponding water reservoir and associated interfacial region. By determining errors and uncertainties, this eliminates again, the dry hole drilling phenomena.

The method addresses the case of multiple hydrocarbon zones, such as, gas over oil over water. By addressing multiple hydrocarbon zones simultaneously, this gives the user the benefit of more accurately determining possible reserves before development decisions are made and of optimally placing development wells and production facilities.

The method is designed to be used for situations where gas is less dense than oil and oil is less dense than water, and data responses vary by structural position, but transition in a very narrow range of depths or over multiple seismic times. A benefit if being able to operate for this situation is that development wells and completions can be more efficiently constructed.

The method operates will when oil is highly viscous and has a low API gravity over water and the data responses vary by structural position in a very narrow range of depths or over multiple seismic times. An advantage of the ability to operate when oil is highly viscous is that development wells and completions can be more efficiently constructed.

This method quantifies responses to changes in pore fluid saturations and by quantifying responses uncertainties in a manner that can be consistently defined, reported and replicated by others provides the advantage of being usable with rock physics analysis and other types of analysis.

Quantification and replication make the output of this method suitable for quantitative comparison with petrophysical analysis, response modeling analysis and geologic analysis, such as, fit to structure analysis.

The method uses a focused sub-volume in a geological structure as a volume of investigation. The volume of investigation within the context of this patent application, applies to either a volume of a hydrocarbon reservoir, an associated water reservoir, contiguous combinations of these reservoirs or combinations of these reservoirs with other reservoirs.

The method uses an attribute file corresponding to volumetric coordinates. The volumetric coordinates can be an X-Y-Z prospect coordinate system, X-Y-Z field development system, internal 3D seismic survey coordinates, and combinations thereof.

The 3D seismic data from which the attribute data is derived must be sufficiently continuous to allow the computation of structural dip and azimuth at numerous locations within the 3D seismic attribute file or dataset.

The attribute file in the method can be a member of one of the following data sets:

a. a set of compiled seismic reflection data processed using a defined attribute generating algorithm for a horizon of interest;
b. a set of compiled seismic reflection data processed using a defined attribute generating algorithm;
c. a set of compiled seismic velocity data processed using a defined attribute generating algorithm;
d. a set of compiled seismic velocity data processed using a defined attribute generating algorithm;
e. a set of collected geologic measurements;
f. a set of petro-physical measurements; and
g. combinations thereof.

The invention specifically relates to a method and computer instructions on computer readable media for determining the existence of a hydrocarbon water interface and/or the existence of a hydrocarbon/hydrocarbon interface.

Given the 3D dip and azimuth as a 3D volume data, corresponding 3D reliability volumes or 3D censor volumes which are representative of portions of the volume of interest within in which reliable dips and azimuths are derived. An example of derived corresponding 3D reliability volumes or 3D censor volumes are depicted in FIG. 1.

FIG. 1 depicts two traces, a seismic attribute and computed local dip vectors data traces 112, and reliability or censor data traces with a cut-off shaded on a sample reliability or censor trace 114. In each of these two traces there is a selected subvolume of interest 102. In the seismic attribute and computed local dip vectors data traces there is additionally a rejected local dip vector not at a reliability location 110. The sequence of reliability locations in the circled areas are also pointed out as 106a-106d. In the reliability or censor data traces with a cut-off shaded on a sample reliability or censor trace there are three reliability location grid location areas 104. For both traces there are local dip vectors at two reliability location 108.

A focused subvolume of interest within the 3D data volume is then selected as the focused subvolume of interest.

Locations within the focused subvolume of interest having a signal greater than, for example 10% of a mean value within the 3D reliability volumes or 3D censor volumes across the focused subvolume of interest are then identified as reliability locations for further computation and consideration. The selection of a cut-off criteria, like 10% greater (or less) than the mean, is determined by the analyst based on geologic conditions, data integrity, noise level and the need to generate a statistically significant set of reliability locations.

Figure 2:
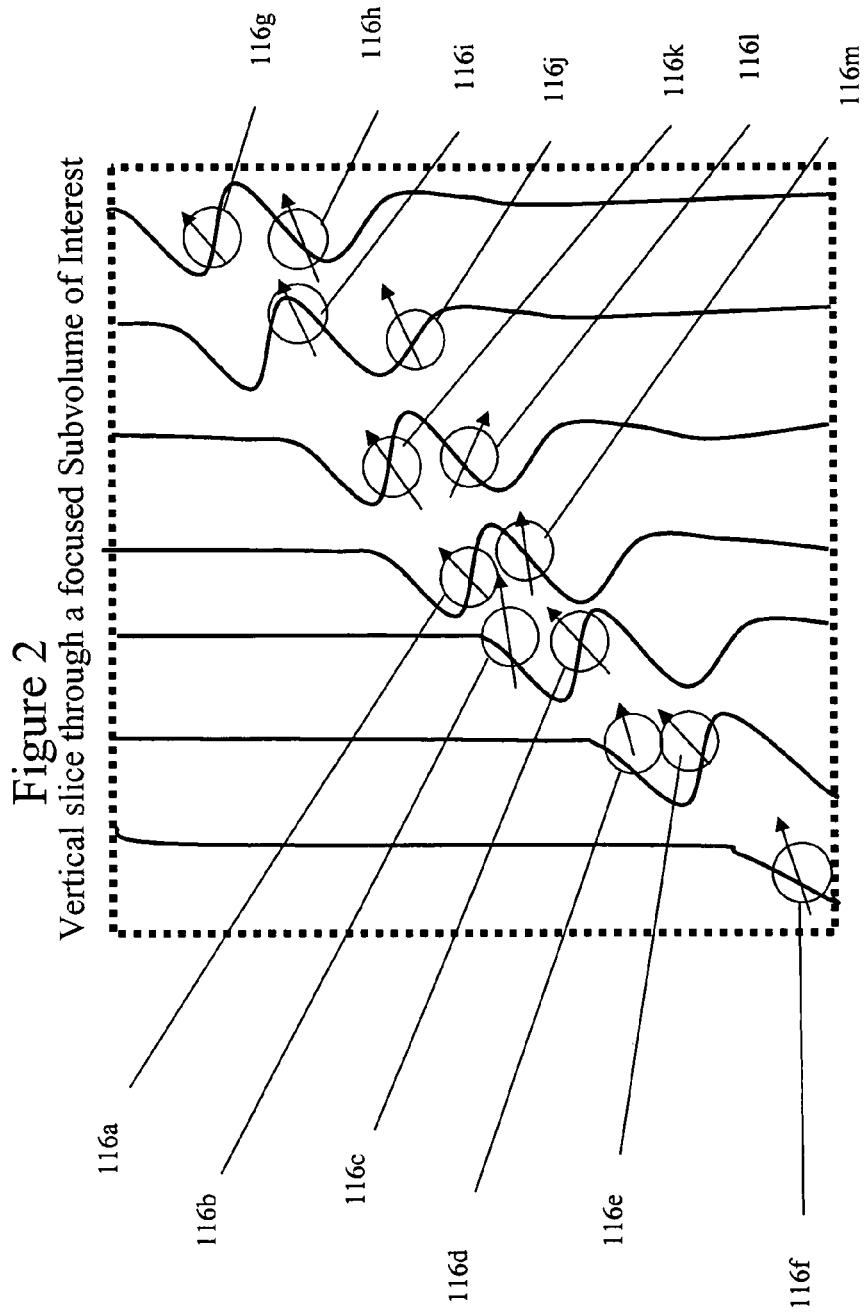
FIG. 2 depicts a group of vector dips around a sequence of reliability locations.

A plurality of vector dips around the reliability locations in the sequence of the reliability locations are identified. FIG. 2 depicts a group of local vector dips at reliability locations shown as elements 118. In addition FIG. 2 depicts the sequence of reliability locations in the circled grid node locations 116a-116m. These elements 116a and 116m are shown on a vertical slice through a selected subvolume of interest of a seismic attribute and computed local dip vectors data trace.

An average for the plurality of vector dips around each reliability location is computed using a formula such as the example one shown below:

Given a sequence of reliability locations, "Seq" with internal index, r, where r=1,2, . . . . Length(Seq), for each dip vector component Vi (i=1,2,3) at a reliability location at the grid location X(I,J,K), the structural dip vector components Si may be defined as:

Si(X(I,J,K))=Sum over r{Vi*W(X(I,J,K), Seq(r))}/Total_Weight where W(X(I,J,K), Seq(r)) is the weight function of X(I,J,K) relative to Seq(r) where Total_Weight=Sum over r{W(X(I,J,K), Seq(r))}

Figure 3:
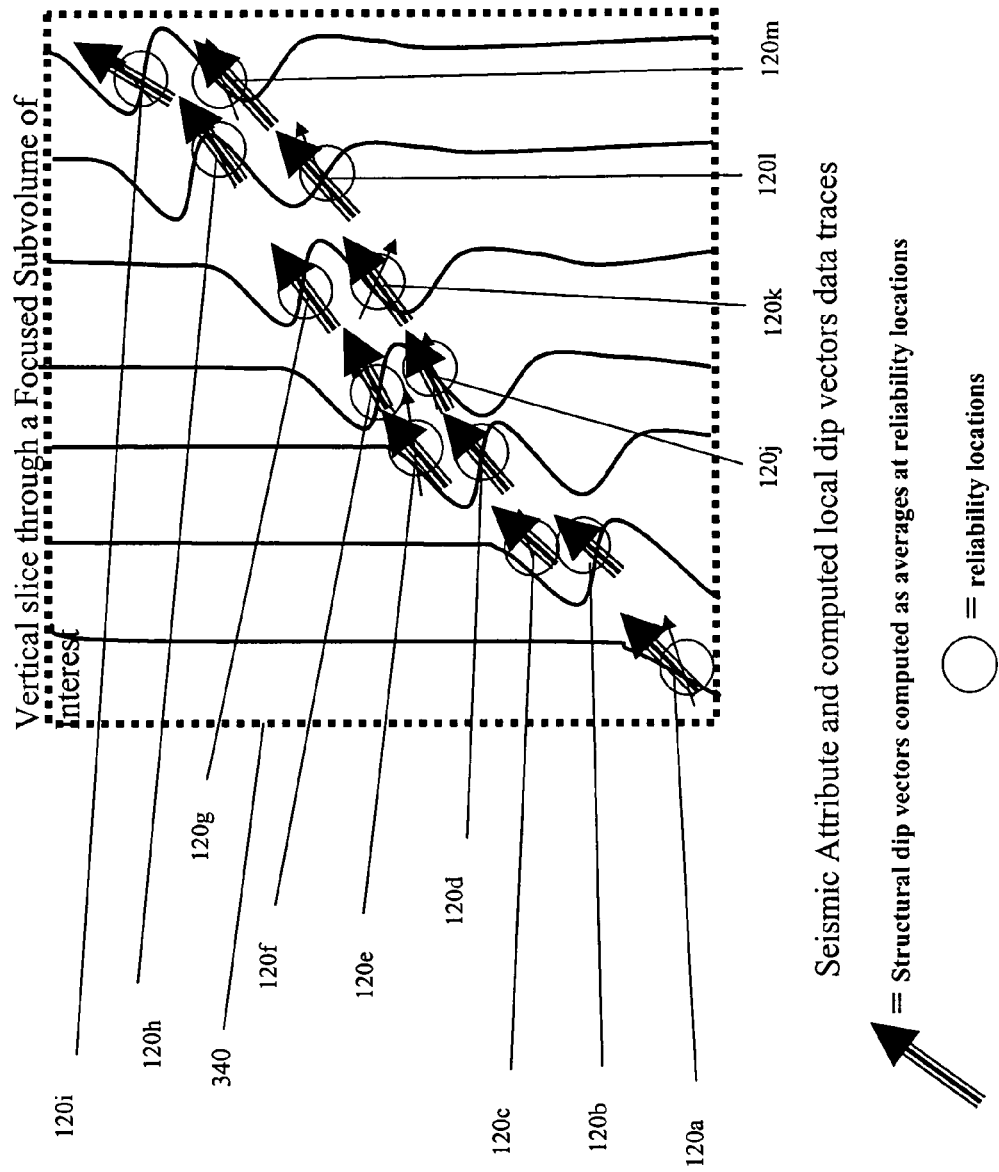
FIG. 3 shows structural dip vectors computed as averages at reliability locations FIG. 2.

The average of the plurality of vector dips forms at least one structural dip for each reliability location. FIG. 3 shows structural dips 120 for a reliability location. The structural dips are for the sequence of reliability locations in the circled grid node locations. Between 1 and N structural dips may be computed for any one reliability location in the sequence of the reliability locations, where N is the length of the sequence of reliability locations. In this method it is contemplated that all reliability locations have at least one structural dip vector, normally computed as an weighted average of dip vectors at nearby reliability locations as described by the equation above. The FIG. 3 shows structural dip vectors computed averages at reliability locations.

A local subvolume of interest interior to the focused subvolume of interest of each reliability location wherein the local subvolume of interest contains 3D dip and azimuth data as a set of vectors is next identified. The local subvolume of interest is normally chosen to include enough grid points above and below a reliability location such that a typical pay sand in the geographic area would be included either above or below the reliability location. For example, if a typical pay sand is 200 ft thick and the background interval velocity is 8000 ft/sec with a 4 MSec sampling rate, then a typical pay sand would be spanned in 50 MSec of 2-way time or 12.5 samples. The local subvolume of interest would then be chosen to be 13 samples above and 13 samples below, spanning a volume of rock roughly 400 feet thick. If the inline and cross-line sampling interval is around 110 feet, then it is normally to sample at least 400 feet in each direction, yielding local subvolume of 8 grid nodes across in each of the x and y (or inline and cross-line) directions. Larger or smaller local subvolumes, may be chosen for the specific needs of a given geologic problem.

Figure 4:
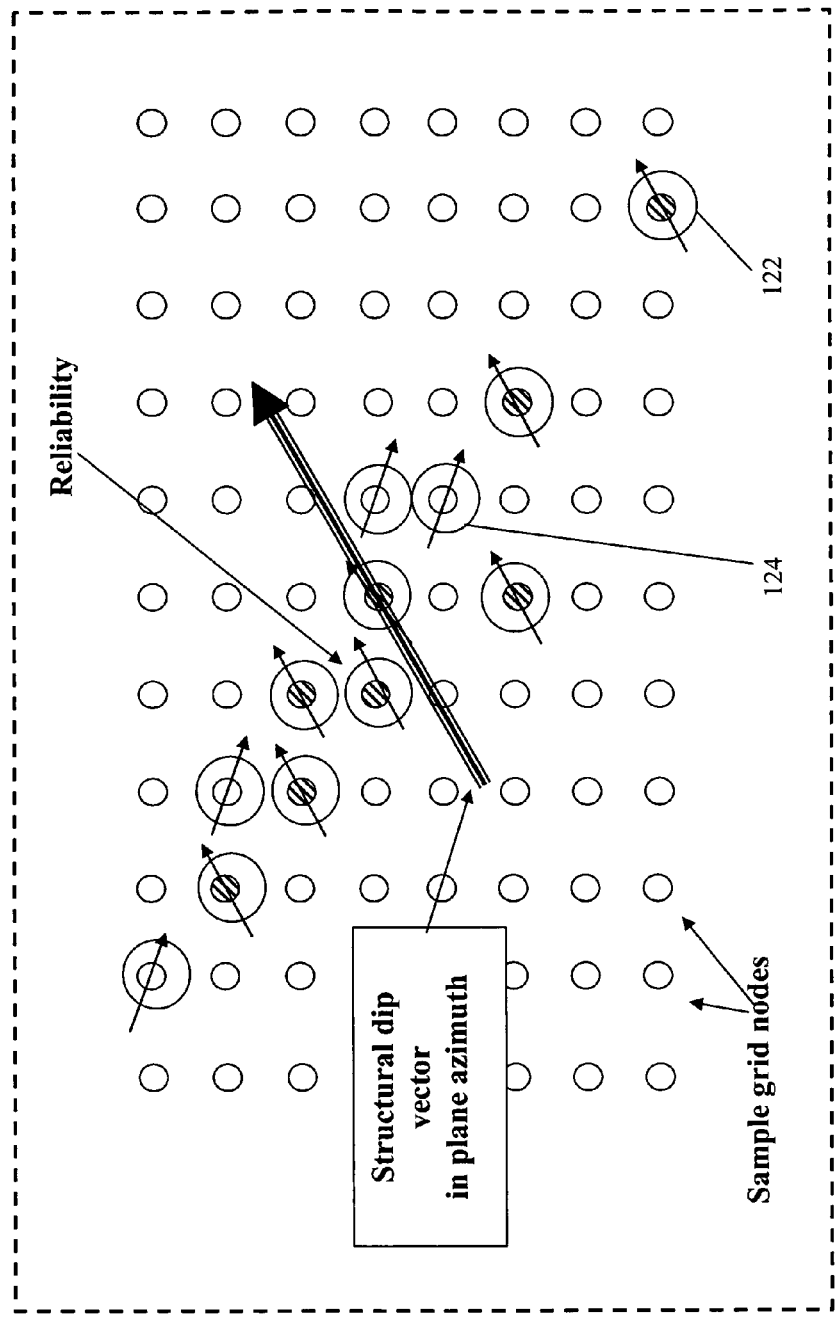
FIG. 4 depicts a set of local vectors within a set of vectors around the azimuth of a structural dip vector.

A set of local vectors is formed from a set of vectors that are within 1 standard deviation of the azimuth of the structural dip vector. FIG. 4 depicts this set of local dip vectors at an azimuth direction at a reliability location as element 124. Hatched circles 122 in FIG. 4 refer to reliability locations with local dip vectors that are parallel to the structural dip vectors. The selection of a cut-off criteria, like 1 standard deviation, of the azimuth is determined by the analyst based on geologic conditions, data integrity, noise level and the need to generate a statistically significant set of local dip vectors.

Figure 5:
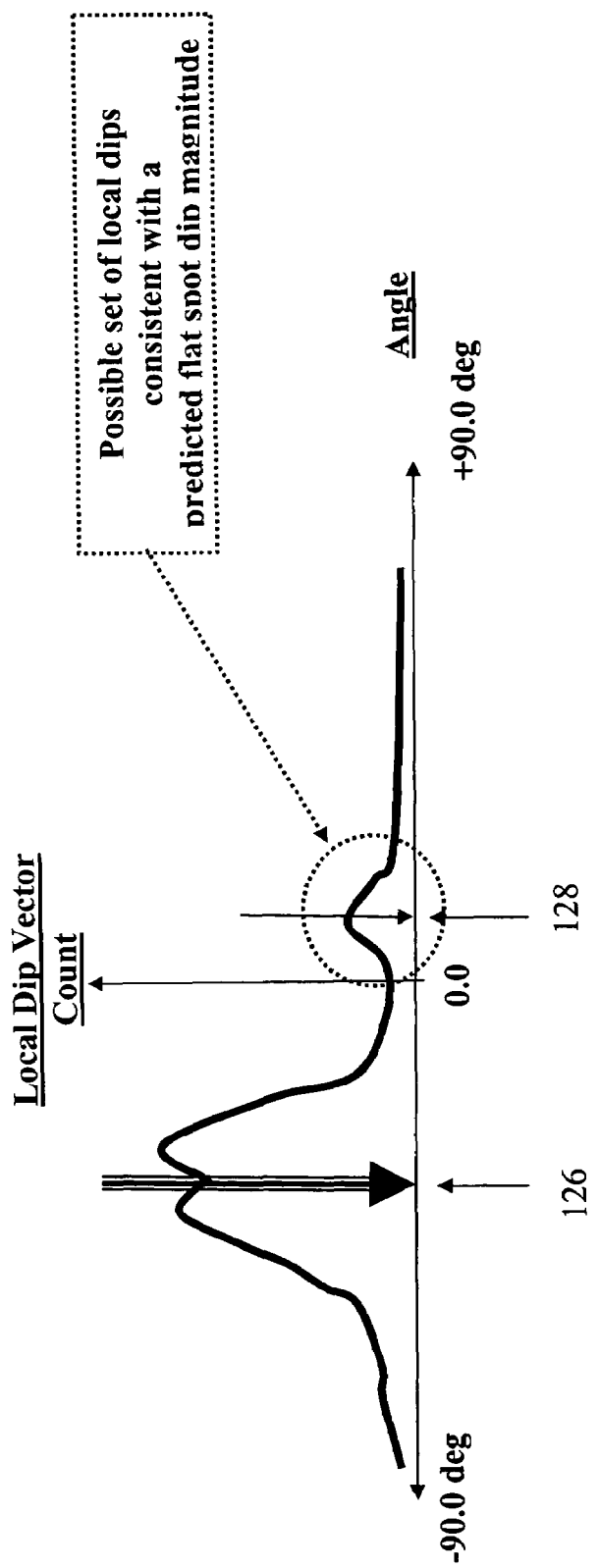
FIG. 5 is an exemplary histogram of dip magnitudes of vectors within the set of local vectors.

Next the dip magnitudes for each vector within the set of local vectors may be formed and a histogram be created of the dip magnitude of these vectors. FIG. 5 depicts an exemplary histogram usable in computing the significance measure of an exemplary local parallel set of vectors. The structural dip vector dip is shown as 126 in FIG. 5 and the flat spot dip vector dip prediction is shown as 128.

Figure 6:
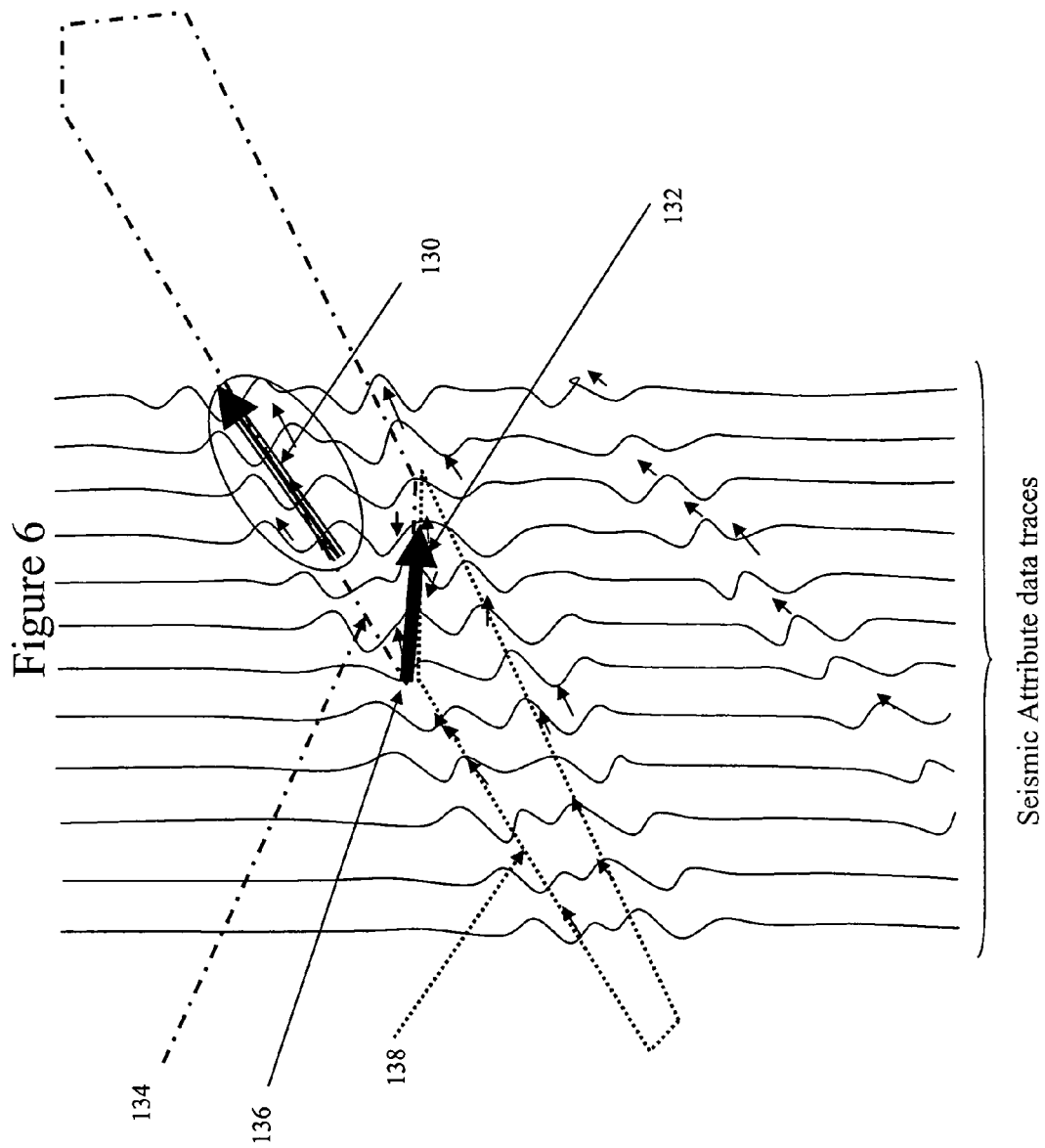
FIG. 6 portrays an exemplary flat spot direction vector.

A flat spot direction vector is then determined for each structural dip vector at the reliability locations. The flat spot direction vector has a flat spot direction vector azimuth equaling to +/-1 standard deviation of the structural azimuth. In the case where the flat spot direction vector dip magnitude as described below is close to zero (+/-1.5 degrees of structural dip), the azimuth of the flat spot direction vector is indeterminate with the vector pointing in any direction in the X-Y plane. An exemplary flat spot direction vector is shown in FIG. 6. FIG. 6 depicts seismic attribute data traces. Structural dips and structural dip vectors are 130, and the actual fluid contact and flat spot event is 132. The hydrocarbon reservoir is shown in 134 in addition to the flat spot direction vector 136. Lastly the water reservoir or water leg is shown as 138.

A flat spot direction vector dip magnitude is then computed from the structural dip magnitude using (1) petrophysical data at each reliability location, or (2) a user specified value of +/-20% of the structural dip magnitude for each reliability location. The choice of a specific user specified value of which +/-20% is an example is made by the analyst or user based on geologic conditions, data integrity, noise level and the need to generate a geophyscial consistent set of reliability flat spot direction vectors.

The following is in an example of flat spot direction vector dip magnitude computed from the structural dip magnitude using petrophysical data: Vs=8000 ft/s, Vhc=7100 ft/s, dTz (r)=2.1 samples/trace then the flat spot dip vectro dip magnitude in the units of samples per trace is 2.1*(7100-8000)/7100=-0.27.

In the case of depth migrated data or the lack of availability of dTz(r) in the units of time samples/trace, dTz(r) can be defined as 2* tan(structural dip)/Vs and where the flat spot dip vector dip magnitude can be similarly scaled into depth, if necessary for the seismic attribute dataset Z axis units in use.

The following is an example of flat spot direction vector dip magnitude computed from the structural dip magnitude using a user specified value, for example -5%: dTz(r)=2.1 samples/trace, then the then the flat spot dip vectro dip magnitude in the units of samples per trace is -0.05*2.1=-0.105.

Figure 7:
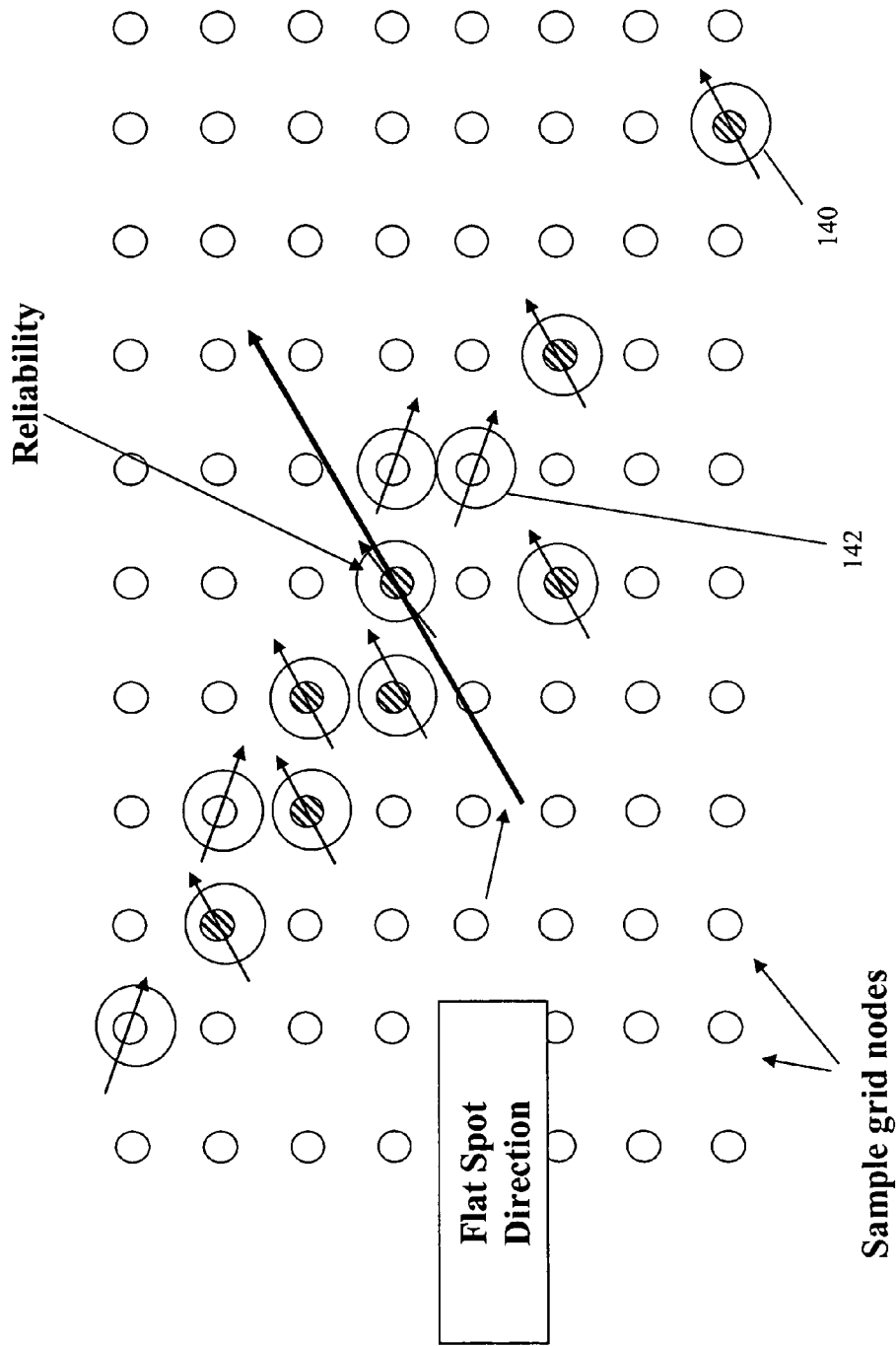
FIG. 7 shows an exemplary set of parallel vectors formed by an embodiment of the invention.

An error quantity is then determined for the flat spot direction vector dip magnitude such as an error quantity of the error in the computed mean flat spot dip vector dip magnitude at a given reliability location and using that error quantity, forming a set of parallel vectors when one or more local vectors are within the local subvolume of interest and the one or more local vectors are substantially parallel with the flat spot direction vector. FIG. 7 depicts the set of parallel vectors formed by this step. FIG. 7 depicts 3D seismic attribute volume slice perpendicular to the Z axis. Hatched circles such as 140 depict reliability locations with local dip vectors that are parallel to the flat spot direction vector. Small arrows such as 142 depict local dip vector azimuth direction at a reliability location.

Figure 8:
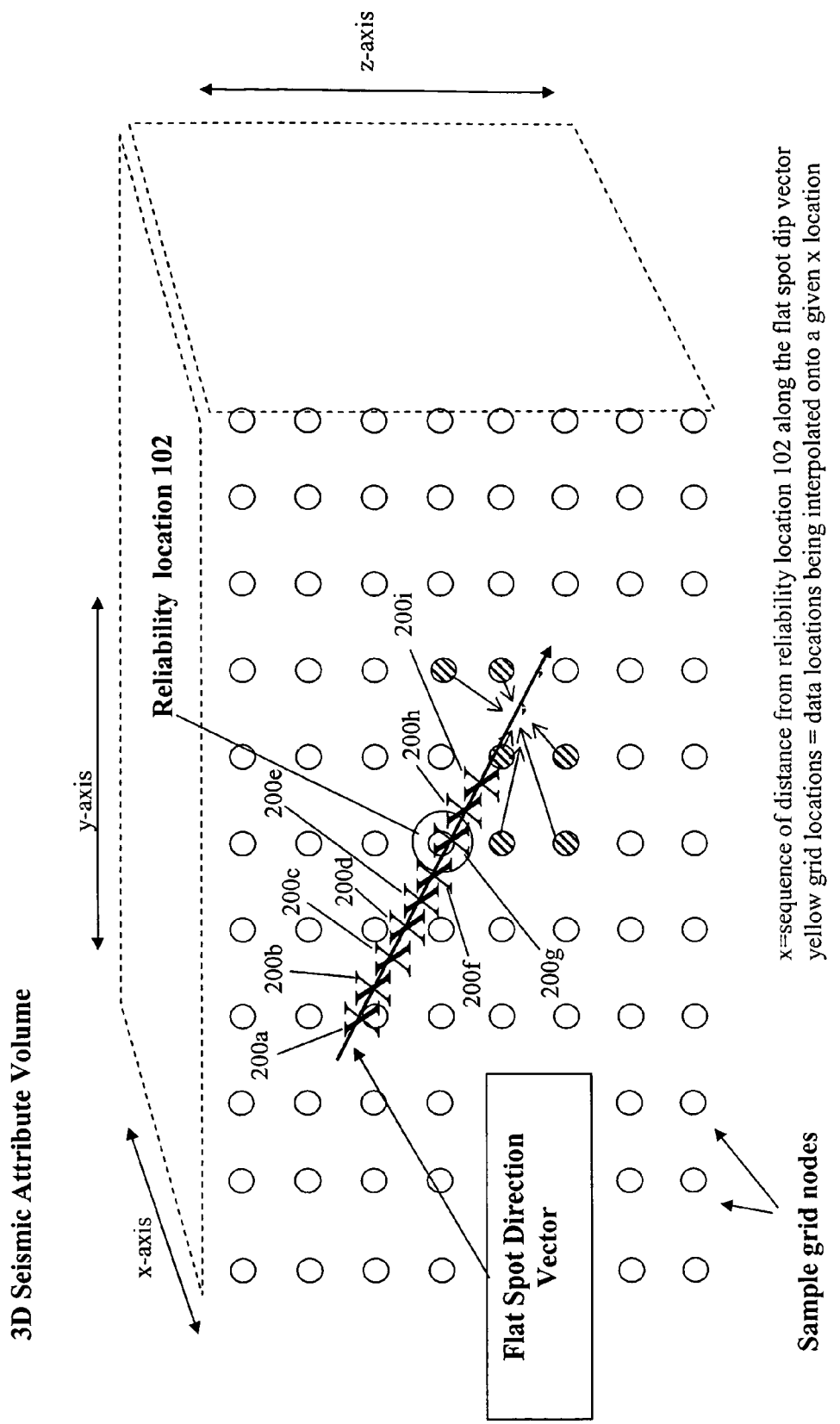
FIG. 8 shows a sequences of distances according to the invention with interpolation from nearby grid locations.

A sequence of distances from reliability location 102 is depicted as shown in FIG. 8. FIG. 8 depicts a 3D seismic attribute volume with x depicting the sequence of locations along the flat spot dip vector. Data locations are interpolated onto a given x location on FIG. 8 as well.

Figure 9:
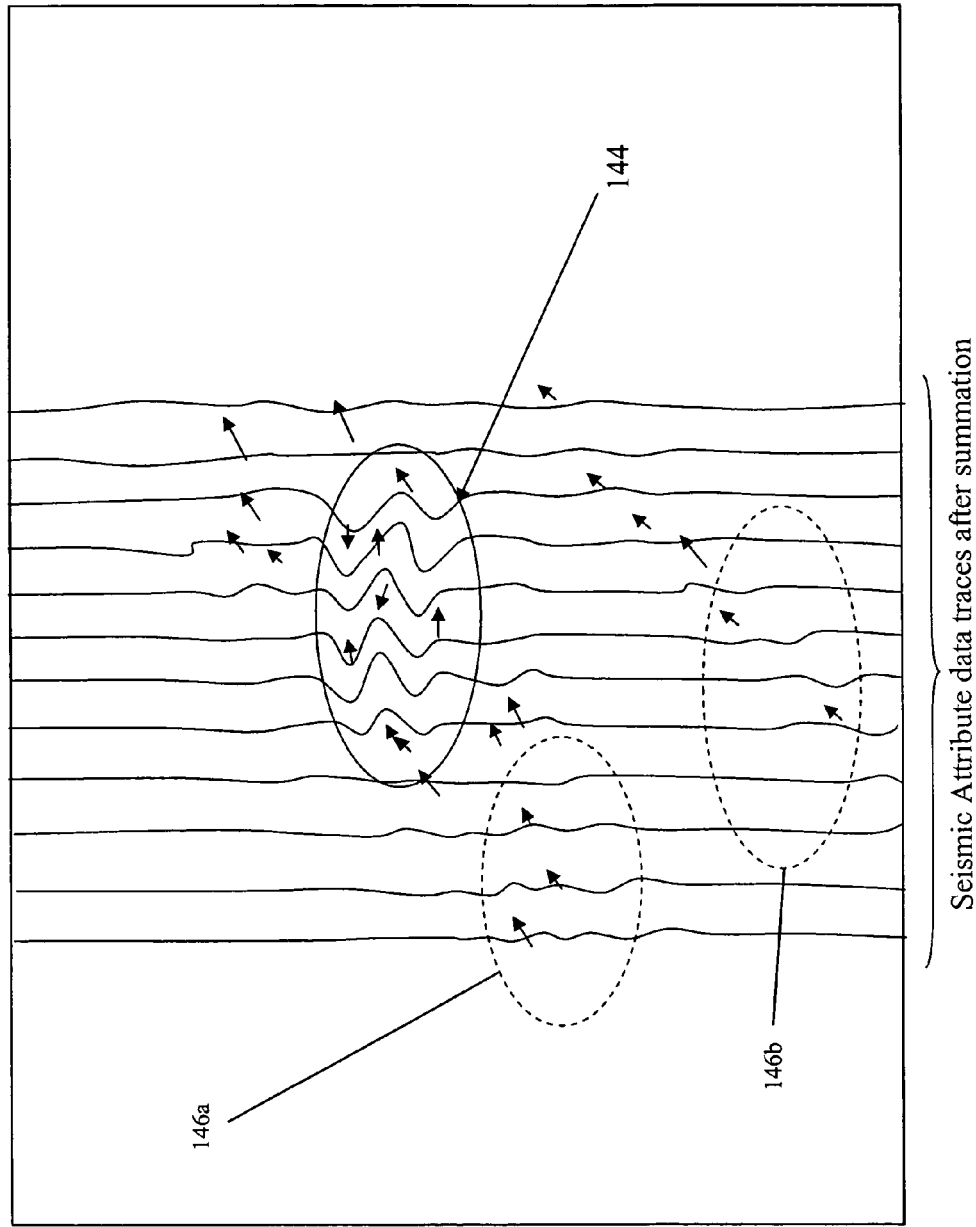
FIG. 9 shows the summed sequences.

Seismic attribute data is interpolated for each sequence of distances onto the flat spot direction vectors for each reliability location using grid points around each reliability location forming a sequence of interpolated seismic attribute data values as shown in FIG. 9. FIG. 9 depicts seismic attribute data traces after summation 144, 146a, 146b. In FIG. 9 events away from the fluid contact are removed, degraded or suppressed by the summation operation (dashed circled areas), relative to a flat spot seismic event (solid circled region). The solid circled region is coincident with an actual fluid contact. The area 144 shows seismic data using the method. Areas 146a and 146b show regions where summed sequences of interpolated data is suppressed by the method.

The summed sequences of interpolated seismic attribute data values for each reliability locations are stored. The summed sequences can include null values for all non-reliability locations within the focused subvolume of interest forming a 3D output volume. This sequence of steps for each subvolume can be repeated for many subvolumes of interest forming a 3D output volume.

The present embodiments relate to improvements in the scanning of multiple volumes of geophysical data in order to search for anomalous data points related to flat spots and fluid contact effects. The anomalous data points can be related to the presence of hydrocarbon or water bearing strata adjacent to the corresponding depth locations of the data points.

The embodied methods operate on subtle hydrocarbon indicators. The embodied methods fully characterize the hydrocarbon fluid contact inner and outer edges. The embodied methods can be used determine the errors and uncertainties in measurements and data attribute results relative to a given hydrocarbon reservoir and the corresponding water reservoir interfacial region.

The method ends by evaluating the output data set to find discrete sampling locations with specific geophysical responses in the output 3D dataset. Anomalous data points, depicted by the size and location of groups of sampling locations, can be related to the presence of hydrocarbon or water bearing strata at or adjacent to the corresponding depth locations of the data points.

In an alternative embodiment, the method of selecting the focus sub-volume can include an element of randomness in order to obtain a more objective analysis of the geophysical data sets. The method of selecting the focus sub-volume can further include a systematic element in order to ensure that all points of interest in a three-dimensional seismic survey volume are analyzed.

The described method utilizes a proximal approach in which each focus sub-volume is proximal to the previous. The benefit of the proximal approach is that the approach ensures that each point of interest in a three-dimensional seismic survey volume can be analyzed.

The methods can utilize a systematic approach. The systematic approach is performed by selecting subsequent focus sub-volumes that are adjacent and below and/or above the previous focus sub-volume. Once the focus sub-volumes reach the bottom of a survey volume, the systematic approach chooses a focus sub-volume adjacent and to the side of focus sub-volume in the previous "column". Subsequent focus sub-volumes and chosen below and/or above the previous focus sub-volumes until that "column" in the survey volume is analyzed. This systematic approach analyzes the data by processing data in "columns" then "rows" to ensure that each point of interest in a three-dimensional seismic survey volume is analyzed.

Figure 10:
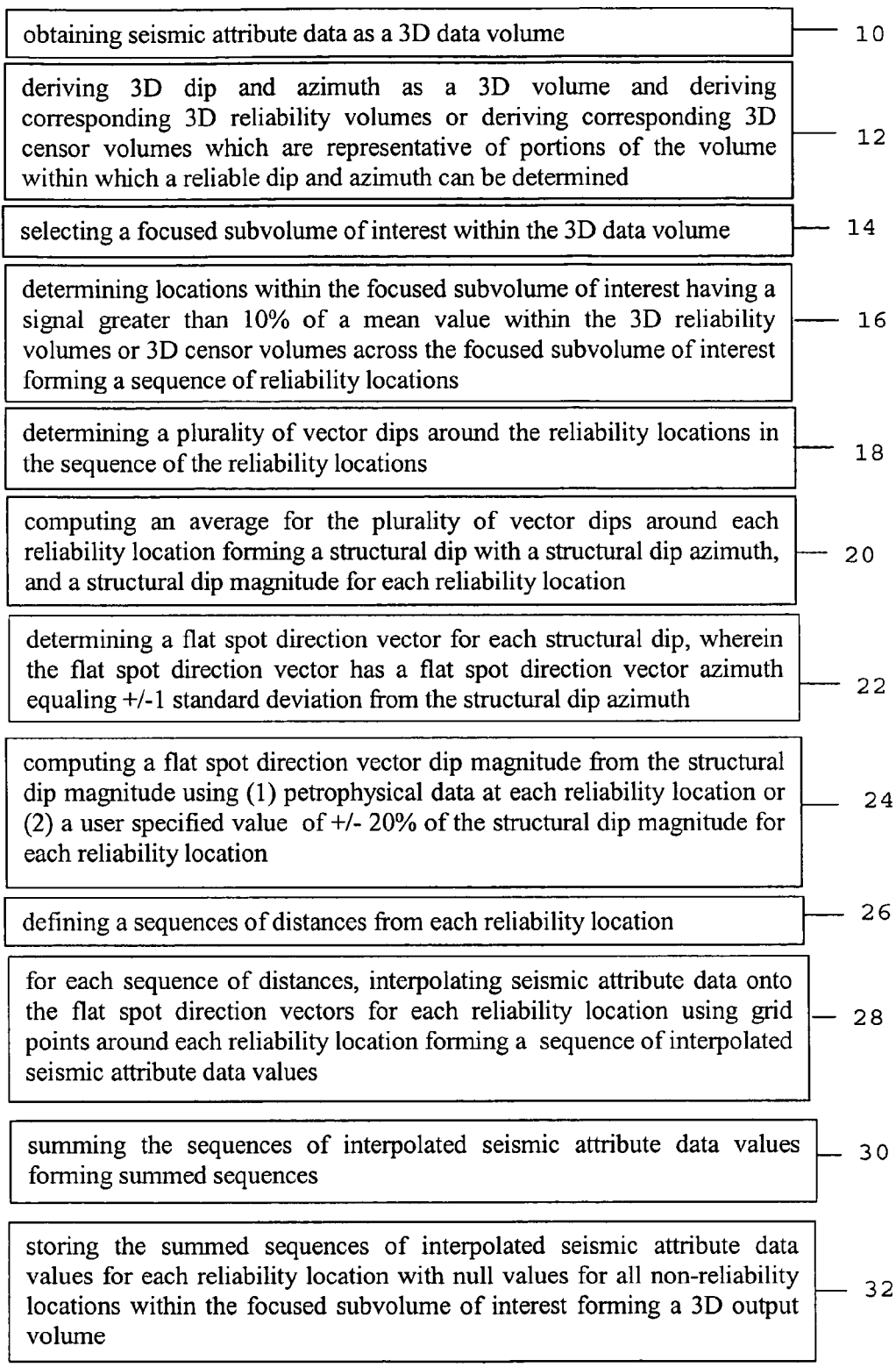
FIG. 10 shows the flow chart of the process.

FIG. 10 is a flow chart of the method of the invention.

The method of the application begins with obtaining seismic attribute data as a 3D data volume (10). The method continues with deriving 3D dip and azimuth as a 3D volume and deriving corresponding 3D reliability volumes or deriving corresponding 3D censor volumes which are representative of portions of the volume within which a reliable dip and azimuth can be determined (12). Next the method continues by selecting a focused subvolume of interest within the 3D data volume (14). A determination is then made for determining locations within the focused subvolume of interest having a signal greater than a user specified value, for example 10% of a mean value within the 3D reliability volumes or 3D censor volumes, across the focused subvolume of interest forming a sequence of reliability locations (16). This continues with determining a plurality of vector dips around the reliability locations in the sequence of the reliability locations (18). Next the method is computing an average for the plurality of vector dips around each reliability location forming a structural dip with a structural dip azimuth, and a structural dip magnitude for each reliability location (20). The method then continues with determining a flat spot direction vector for each structural dip, wherein the flat spot direction vector has a flat spot direction vector azimuth equaling a user specified value, for example +/−1 standard deviation from the structural dip azimuth (22). Next the method is computing a flat spot direction vector dip magnitude from the structural dip magnitude using (1) petrophysical data at each reliability location or (2) a user specified value of for example +/−20% of the structural dip magnitude for each reliability location (24). Subsequently the method continues by defines a sequence of distances from each reliability location (26). The method then for each sequence of distances, interpolates seismic attribute data onto the flat spot direction vectors for each reliability location using grid points around each reliability location forming a sequence of interpolated seismic attribute data values (28). The next method sums the sequences of interpolated seismic attribute data values forming summed sequences (30). Finally the method stores the summed sequences of interpolated seismic attribute data values for each reliability location with null values for all non-reliability locations within the focused subvolume of interest forming a 3D output volume (32). The method is repeated for all subvolumes of interest within a 3D seismic attribute dataset.

The sequence of interpolated seismic attribute data values is added to form each summed sequence.

FIG. 8 shows interpolation of seismic attribute data with sequence summation.

The summed sequences of interpolated seismic attribute data values for each reliability location also contain null values for all non-reliability locations within the focused subvolume of interest forming a 3D output volume. This 3D output volume is then stored.

The steps of the invention can be applied iteratively to all 3D seismic data in the area of exploration or commercial interest.

In yet another embodiment includes the step of interpreting the 3D output volume to identify contiguous reliability location summed sequences across a geologic structure.

In one embodiment, the reliability location summed sequences are greater than 1 standard deviation from the mean of all reliability location summed sequences in the 3D output volume. In computing both the mean and standard deviation, only attribute data from reliability locations and non-null data is used. It is possible that a reliability location may have a null value.

Additionally the reliability location of summed sequences are for specified times or specified depths. An example of the summed sequence specified time is between 4.000 Seconds and 4.004 Seconds. An example of the summed sequences specified depths could be between 10,000 ft Subsea and 10,020 ft Subsea.

In one embodiment the steps of selecting a focused subvolume of interest, determining locations within the focused subvolume of interest, determining a plurality of vector dips, computing an average for the plurality of vector dips, determining a flat spot direction vector, for each structural dip, determining a flat spot direction vector dip magnitude, defining a sequence of distances from each reliability location, interpolating seismic attribute data, summing the sequences of interpolated seismic attribute data, and storing the summed sequences of interpolated seismic attribute data values are repeated for all regions of interest in a 3D seismic data set. FIG. 8 depicts and example of the set of selecting a focused subvolume of interest, and computing the summed sequences for that focused subvolume.

In an alternate embodiment seismic attributes at grid points around each reliability location to interpolate seismic attribute data onto the direction of each flat spot direction vector for each reliability location.

In one embodiment when a flat spot direction vector for each structural dip is determined the flat spot direction vector has a flat spot direction vector azimuth equaling +/−1 standard deviation of the structural dip azimuth. The +/−1 standard deviation can be +/−1 or +/−2 or +/−3 or whatever other deviation that is sought after.

In another embodiment when a flat spot direction vector dip magnitude is computed it can be computed using either petrophysical data at each reliability location or a user specified value, for example +/−20% of the structural dip magnitude for each reliability location.

In yet another embodiment a user specified sequence of distances is used for each sequence of distances. An example of a user specified sequence of distances, would be in units of grid spacing, minus 5 to plus 5 with an increment of one, i.e. −5, −4, −3, −2, −1, 0, 1,2,3,4, and 5.

In one embodiment instead of seismic attribute data, derived rock property data is used. Derived rock property data can be well log resistivity or Sw.

In an alternating embodiment the interpolating of seismic attribute data is performed using weighted interpolation method. Incorporated by reference herein is the weighted interpolation method model from P. A. Burrough, "Principles of Geographical Information System," by Oxford Univeristy Press, 1998, see also the weighted interpolation method by O. Dubrule, see "Seismic Data Integration in Earth Models" from the Distinguished Instructor Series No. 6 of the European Association of Geoscientists & Engineers 2003. These methods allow the user to specify the style of interpolation to use in projecting the data on the direction of the flat spot dip vector using an inverse distance weighted interpolation method that includes a weighting function, such as reflection strength in the numerator and the scaled distance plus a constant raised to the jth power in the denominator, such as the weight for any given datapoint. The inverse distance weighted interpolation method uses the formula weight=(weighting function)/(distance to the interpolation point)$^j$, wherein j is a real number or zero.

In yet another embodiment the step of generating a plurality of contiguous reliability location summed sequences which highlight locations of water to hydrocarbons interfaces in subsurface geological structures.

In discussing this method, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water in quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. For example, in offshore exploration and production, the datum is typically taken to be mean sea level. Depths or seismic times are then referenced to mean sea level as the datum.

The seismic data volumes used in the analysis can be generated from any defined attribute generating algorithm. Examples of data that can be analyzed in seismic volume format include seismic velocity data processed using a defined attribute generating algorithm, a set of geophysical gravity data extract, compiled or collected for a 3D volume, or a set of petro-physical measurements, such as resistively, for a 3D volume of interest, and a set of compiled or collected engineering data, such as initial production rate (IP) for a horizon of interest.

The 3D seismic volume file can be a set of compiled seismic reflection data, processed using a defined attribute generating algorithm and extracted for, in relation to or in conjunction with a sub-volume of interest or a set of compiled seismic velocity data processed using a defined attribute generating algorithm and extracted for or in conjunction with a sub-volume of interest. This data can be processed to extract internal structures within the data, as in amplitude variation with recording offset or NMO velocity. Such specialized extractions stored in a 3D volume format can be suitable as input to these embodied methods.

In one embodiment the method of determines the existence of and location of hydrocarbon and water fluid contacts by analyzing spatial changes in 3D seismic data. The method obtains seismic attribute data as a 3D data volume. The method can additionally obtain 3D dip and azimuth data as at least one set of 3D volume data and deriving corresponding 3D reliability volumes or deriving 3D censor volumes which are representative of portions of the at least one set of 3D volume data within which 3D dip data and azimuth data can be reliably determined. It is possible for the method to select a focused subvolume of interest within the at least one set of 3D volume data 3D data volume. The method can then determine reliability locations within the focused subvolume of interest having non-null 3D dip data and non-null 3D azimuth data within the 3D reliability volumes or 3D censor volumes across the focused subvolume of interest forming a sequence of reliability locations. The method can additionally computer an average for a plurality of vector dips around each reliability location in the sequence of the reliability locations forming at least one structural dip vector for each reliability location. It is possible for the method to determine a flat spot direction vector for each structural dip vector at each reliability location. It is additionally possible for the method to define sequences of distances from each reliability location, to locations for interpolating seismic attribute data. The method can additionally for each sequence in the sequence of distances, interpolate seismic attribute data onto at least one flat spot direction vector for each reliability location forming sequences of interpolated seismic attribute data values. The method can additionally sum the sequences of interpolated seismic attribute data values forming summed sequences. It is possible for the method to store the summed sequences of interpolated seismic attribute data values for each reliability location with null values for all non-reliability locations within the focused subvolume of interest, forming a 3D output subvolume. The method can additionally be repeated for all 3D volume data forming a 3D output volume.

In one embodiment the flat spot direction vector is computed from each structural dip vector using (1) petrophysical data at each reliability location, or (2) a user specified value for each structural dip vector for each reliability location.

In an alternate embodiment inputting petrophysicial data for each reliability location to compute expected flat spot direction vectors from the structural dip at each reliability location.

In yet another embodiment the seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

It is additionally possible for the embodiment to include the step of interpreting the 3D output volume to identify contiguous locations across a geologic structure having summed sequences that are statically significant.

In one embodiment the summed sequences are for a specified range of times or specified range of depths.

In yet another embodiment uses seismic attributes at grid points around each reliability location to interpolate seismic attribute data onto the direction of each flat spot direction vector for each reliability location.

In another embodiment uses a user specified sequence of distances for each sequence of distances.

In one embodiment instead of seismic attribute data, derived rock property data is used.

In yet another embodiment the interpolating of seismic attribute data is performed using weighted interpolation method.

In one embodiment the step of generating a plurality of contiguous reliability location summed sequences which highlight locations of water to hydrocarbons interfaces in subsurface geological structures.

It is additionally possible for the embodiment to include computer instructions on a computer readable media, comprising instructions to cause a processor to determine the existence of and location of hydrocarbon and water fluid contacts by analyzing spatial changes in 3D seismic data. The method can additionally obtain 3D dip and azimuth data as at least one set of 3D volume data and deriving corresponding 3D reliability volumes or deriving 3D censor volumes which are representative of portions of the at least one set of 3D volume data within which 3D dip data and azimuth data can be reliably determined. It is possible for the method to select a focused subvolume of interest within the at least one set of 3D volume data 3D data volume. The method can then determine reliability locations within the focused subvolume of interest having non-null 3D dip data and non-null 3D azimuth data within the 3D reliability volumes or 3D censor volumes across the focused subvolume of interest forming a sequence of reliability locations. The method can additionally computer an average for a plurality of vector dips around each reliability location in the sequence of the reliability locations forming at least one structural dip vector for each reliability location. It is possible for the method to determine a flat spot direction vector for each structural dip vector at each reliability location. It is additionally possible for the method to define sequences of distances from each reliability location to locations for interpolating seismic attribute data. The method can additionally for each sequence in the sequence of distances, interpolate seismic attribute data onto at least one flat spot direction vector for each reliability location forming sequences of interpolated seismic attribute data values. The method can additionally sum the sequences of interpolated seismic attribute data values forming summed sequences. It is possible for the method to store the summed sequences of interpolated seismic attribute data values for each reliability location with null values for all non-reliability locations within the focused subvolume of interest, forming a 3D output subvolume. The method can additionally be repeated for all 3D volume data forming a 3D output volume.

While this method has been described with emphasis on the preferred embodiments, it should be understood that within the scope of the appended claims, the method might be practiced other than as specifically described herein.

What is claimed is:

1. A method of determining the existence of and location of hydrocarbon and water fluid contacts by analyzing spatial changes in 3D seismic data comprising the steps of:
   a) obtaining seismic attribute data as a 3D data volume;
   b) obtaining 3D dip and azimuth data as at least one set of 3D volume data and deriving corresponding 3D reliability volumes or deriving 3D censor volumes which are representative of portions of the at least one set of 3D volume data within which 3D dip data and azimuth data can be reliably determined;
   c) selecting a focused subvolume of interest within the at least one set of 3D volume data;
   d) determining reliability locations within the focused subvolume of interest having non-null 3D dip data and non-null 3D azimuth data within the 3D reliability volumes or 3D censor volumes across the focused subvolume of interest forming a sequence of reliability locations;
   e) computing an average for a plurality of vector dips around each reliability location in the sequence of the reliability locations forming at least one structural dip vector for each reliability location;
   f) determining a flat spot direction vector for each structural dip vector at each reliability location;
   g) defining sequences of distances from each reliability location to locations for interpolating seismic attribute data;
   h) for each sequence in the sequence of distances, interpolating seismic attribute data onto at least one flat spot direction vector for each reliability location forming sequences of interpolated seismic attribute data values;
   i) summing the sequences of interpolated seismic attribute data values forming summed sequences;
   j) storing the summed sequences of interpolated seismic attribute data values for each reliability location with null values for all non-reliability locations within the focused subvolume of interest, forming a 3D output subvolume; and
   k) the method is then repeated for all 3D volume data forming a 3D output volume.

2. The method of claim 1, wherein the flat spot direction vector is computed from each structural dip vector using (1) petrophysical data at each reliability location, or (2) a user specified value for each structural dip vector for each reliability location.

3. The method of claim 1, further comprising inputting petrophysicial data for each reliability location to compute expected flat spot direction vectors from the structural dip at each reliability location.

4. The method of claim 1, wherein the seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

5. The method of claim 1, further comprising the step of interpreting the 3D output volume to identify contiguous locations across a geologic structure having summed sequences that are statically significant.

6. The method of claim 1, wherein the summed sequences are for a specified range of times or specified range of depths.

7. The method of claim 1, further comprising using seismic attributes at grid points around each reliability location to interpolate seismic attribute data onto the direction of each flat spot direction vector for each reliability location.

8. The method of claim 1, further comprising using a user specified sequence of distances for each sequence of distances.

9. The method of claim 1, wherein the interpolating of seismic attribute data is performed using weighted interpolation method.

10. The method of claim 1, further comprising the step of generating a plurality of contiguous reliability location summed sequences which highlight locations of water to hydrocarbons interfaces in subsurface geological structures.

11. Computer instructions on a computer readable media, comprising instructions to cause a processor to determine the existence of and location of hydrocarbon and water fluid contacts by analyzing spatial changes in 3D seismic data comprising the steps of:

a) obtaining seismic attribute data as a 3D data volume;
  b) obtaining 3D dip and azimuth data as at least one set of 3D volume data and deriving corresponding 3D reliability volumes or deriving 3D censor volumes which are representative of portions of the at least one set of 3D volume data within which 3D dip data and azimuth data can be reliably determined;
  c) selecting a focused subvolume of interest within the at least one set of 3D volume data 3D data volume;
  d) determining reliability locations within the focused subvolume of interest having non-null 3D dip data and non-null 3D azimuth data within the 3D reliability volumes or 3D censor volumes across the focused subvolume of interest forming a sequence of reliability locations;
  e) computing an average for a plurality of vector dips around each reliability location in the sequence of the reliability locations forming at least one structural dip vector for each reliability location;
  f) determining a flat spot direction vector for each structural dip vector at each reliability location;
  g) defining sequences of distances from each reliability location to locations for interpolating seismic attribute data;
  h) for each sequence in the sequence of distances, interpolating seismic attribute data onto at least one flat spot direction vector for each reliability location forming sequences of interpolated seismic attribute data values;
  i) summing the sequences of interpolated seismic attribute data values forming summed sequences;
  j) storing the summed sequences of interpolated seismic attribute data values for each reliability location with null values for all non-reliability locations within the focused subvolume of interest, forming a 3D output subvolume; and
  k) the method is then repeated for all 3D volume data forming a 3D output volume.

* * * * *